(12) United States Patent
Yu (10) Patent No.: US 6,356,059 B1
(45) Date of Patent: Mar. 12, 2002

(54) BUCK CONVERTER WITH NORMALLY OFF JFET

(75) Inventor: Ho-Yuan Yu, Saratoga, CA (US)

(73) Assignee: Lovoltech, Inc., Santa Clara, CA (US)

( * ) Notice: Subject to any disclaimer, the term of this patent is extended or adjusted under 35 U.S.C. 154(b) by 0 days.

(21) Appl. No.: 09/785,972

(22) Filed: Feb. 16, 2001

(51) Int. Cl.$^7$ .......................... G05F 1/613; G05F 1/652; G05F 1/26
(52) U.S. Cl. .................. 323/223; 323/263; 323/282
(58) Field of Search ................................ 323/222, 223, 323/259, 263, 282

(56) References Cited

U.S. PATENT DOCUMENTS

| | | | | |
|---|---|---|---|---|
| 4,523,111 A | * | 6/1985 | Baliga ..................... | 307/574 |
| 4,808,853 A | * | 2/1989 | Taylor ..................... | 307/473 |
| 4,853,561 A | * | 8/1989 | Gravrok .................. | 307/443 |
| 5,055,723 A | * | 10/1991 | Bowers et al. ........... | 307/581 |

* cited by examiner

Primary Examiner—Bao Q. Vu (74) Attorney, Agent, or Firm—Wagner Murabito & Hao LLP (57) ABSTRACT

An enhancement mode JFET as a switching device in a buck converter circuit combined with a single rectifier diode and an inductor. A control circuit coupled to the gate of the JFET switches the JFET between a current conducting state and a current blocking state. The ratio of converter dc output voltage to converter dc input voltage is determined by the ratio of JFET conducting time to the sum of JFET conducting time and JFET blocking time. This pulse width modulation scheme is thus used to adjust the dc output voltage level. Limits on both frequency of operation and duty cycle result from slow switching speeds. Each time a device switches between states, a certain amount of energy is lost. The slower the device switching time, the greater the power loss in the circuit. The effects become very important in high frequency (fast switching) and/or high power circuits where as much as 50% of the losses are due to excessive switch transition time. The enhancement mode JFET is an excellent switch since it has a very small internal resistance between source and drain in the conducting state as well as a very small terminal voltage. As a result, very little power is dissipated in the JFET itself. Furthermore, the current carriers in the JFET are all majority carriers which results in very short switching transition times. As a result, the present invention offers significant improvements over existing circuits in high frequency switching as well as high power applications.

23 Claims, 9 Drawing Sheets

BUCK CONVERTER WITH NORMALLY OFF JFET

RELATED APPLICATIONS

The following copending U.S. patent application Ser. No. 09/430,500, "NOVEL JFET STRUCTURE AND MANUFACTURE METHOD FOR LOW ON RESISTANCE AND LOW VOLTAGE APPLICATIONS", Ho-Yuan Yu, filed Oct. 29, 1999, is incorporated herein by reference for all purposes. The following copending U.S. patent application Ser. No. 09/708,336, "STARTER DEVICE FOR NORMALLY "OFF" JFETS", Ho-Yuan Yu, filed Nov. 7, 2000, is incorporated herein by reference for all purposes.

BACKGROUND OF THE INVENTION

1. Field of the Invention

The present invention relates to the field of direct current (dc) power supplies designed for converting a given dc voltage to another dc voltage or dc current. More particularly, the present invention relates to utilization of enhancement mode Junction Field Effect Transistors (JFET) to construct dc-dc converters commonly known as buck converters.

2. Related Art

Modem electronic circuit applications frequently require dc power supplied at several different voltage levels. It is often desirable to produce multiple dc voltage levels from a single dc voltage source by means of electronic circuits. This is particularly true in portable equipment where batteries are utilized either as the primary source of electrical energy or as the backup power source. Laptop computers, Personal Digital Assistants (PDA), pagers and cell phones all have such requirements. In a class of electronic circuits known as dc-dc converters, electric energy is transferred between two dc circuits operating at different voltage and current levels. Included in these circuits are the buck converter, the boost converter, and the buck-boost converter.

The buck converter is a direct switching circuit for converting input dc voltage to output dc current. The buck converter is used in a wide range of circuit applications including de motor controllers and switching power supplies. The output voltage of the buck converter is always less than the input or source voltage. This circuit is also known as a buck regulator, a step-down converter and a forward converter. The basic circuit is a two-port network having a pair of input terminals and a pair of output terminals. The single dc power source is connected across the two input terminals and a dc load is connected across the is two output terminals. Within the two-port, the ideal circuit consists of two switching devices, appropriate control circuitry for the two switching devices, and a single inductor.

An ideal switching device has an on state and an off state. In the on state, a device conducts an electric current between two terminals with zero voltage drop across the terminals. In the off state, a device will support any voltage drop across two terminals while conducting zero current between the two terminals. A number of different electronic devices are used as switches in buck converters, all of which depart from the ideal in one or more respects. Some examples of such devices include semiconductor diodes, bipolar junction transistors (BJT), field effect transistors (FET), and silicon controlled rectifiers (SCR).

One major concern with conventional switching devices is the non-zero voltage between the two current conducting terminals while in the on state. The result is power dissipation in the switching device with excessive heat generation and a reduction in overall circuit efficiency. A second major concern stems from the dynamic behavior of the switching devices. That is, the speed with which a device will transition between the on and the off states. Limits on both frequency of operation and duty cycle result from slow switching speeds. Every time a device switches between states, a certain amount of energy is lost. The slower the device switching time, the greater the power loss in the circuit The effects become very important in high frequency (fast switching) and/or high power is circuits where as much as 50% of the losses are due to excessive switching transition time.

SUMMARY OF THE INVENTION

Accordingly, what is needed is a switching device useful in dc power supply circuits that will approach the operation of an ideal switching device. What is further needed is a switching device that has close to zero volts across its conduction terminals while in the on or current conducting state. What is also needed is a switching device that is capable of operating in switching power supplies at higher operating frequencies by virtue of very short transition times between states. What is needed yet is a switching device having very low terminal voltage in the on state and very short transition times between states that can be used in high power circuits. The present invention provides these advantages and others not specifically mentioned above but described in the sections to follow.

An enhancement mode JFET as a switching device in a buck converter circuit combined with a single rectifier diode and an inductor. A control circuit coupled to the gate of the JFET switches the JFET between a current conducting state and a current blocking state. The ratio of converter dc output voltage to converter dc input voltage is determined by the ratio of JFET conducting time to the sum of JFET conducting time and JFET blocking time. This pulse width modulation scheme is thus used to adjust the dc output voltage level. Limits on both frequency of operation and duty cycle result from slow switching speeds. Each time a device switches between states, a certain amount of energy is lost The slower the device switching time, the greater the power loss in the circuit The effects become very important in high frequency (fast switching) and/or high power circuits where as much as 50% of the losses are due to excessive switch transition time. The enhancement mode JFET is an excellent switch since it has a very small internal resistance between source and drain in the conducting state as well as a very small terminal voltage. As a result, very little power is dissipated in the JFET itself. Furthermore, the current carriers in the JFET are all majority carriers which results in very short switching transition times. As a result, the present invention offers significant improvements over existing circuits in high frequency switching as well as high power applications.

In one embodiment of the present invention, a buck converter using a normally off JFET is constructed in the form of a two-port network. The negative input terminal is electrically connected to the negative output terminal to form a common ground. A dc power source is connected across the terminals of the input port. A normally off, or enhancement mode n-channel JFET is used as a switching device with source connected to the positive input terminal and drain connected to an internal common node. Control circuitry within the two-port applies a switching control signal to the gate of the JFET. The internal circuit consists of a semiconductor diode, an inductor and a capacitor. The anode of the diode is connected to the common ground and the cathode is connected to the internal common node. The inductor is connected between the internal common node and the positive output terminal. The capacitor is connected across the output terminals. The JFET has very low terminal voltage source to drain when in the on or conducting state. That is to say, the JFET has a very small internal resistance between source and drain in the on state. The current carriers in the JFET are all majority carriers which results in very short switching transition times. As a result, this circuit offers significant improvements over existing circuits in high frequency switching as well as high power applications.

In a second embodiment, an n-channel enhancement mode and a p-channel enhancement mode JFET are used as switching devices in a buck converter circuit. The circuit topology is the same as the first configuration with the diode replaced by the p-channel JFET. The p-channel JFET is connected with source to the common ground and drain to the internal common node. The gates of the two JFETs are connected together, and a switching signal is applied to the gates by means of an internal control circuit. Both JFETs have a very low terminal voltage source to drain when in the on or conducting state. That is to say, each JFET has a very small internal resistance between source and drain in the on state. The current carriers in the JFETs are all majority carriers which results in very short switching transition times. As a result, this circuit also offers significant improvements over existing circuits in high frequency switching as well as high power applications.

In a third embodiment, two n-channel enhancement mode JFETs are used as switching devices in a buck converter circuit The circuit topology is the same as the first configuration with the diode replaced by a second n-channel JFET. This second n-channel JFET is connected with source to the common ground and drain to the internal common node. In this configuration, the control circuit generates two switching signals that are one hundred eighty degrees out of phase; that is to say; the two signals are mirror images. One control signal is applied to the gate of the first JFET and the second control signal is applied to the gate of the second JFET in order to switch the JFETs on and off. The phase difference between the two control signals ensure that one JFET is always in a non-conducting state while the other JFET is in a conducting state. Both JFETS have a very low terminal voltage source to drain when in the on or conducting state. That is to say, each JFET has a very small internal resistance between source and drain in the on state. The current carriers in the JFETs are all majority carriers which results in very short switching transition times. As a result, this circuit also offers significant improvements over existing circuits in high frequency switching as well as high power applications.

In a fourth embodiment two n-channel enhancement mode JFETs are used as switching devices in a buck converter circuit. The circuit topology is the same as the first configuration with the diode replaced by a second n-channel JFET. This second n-channel JFET is connected with source to the common ground and drain to the internal common node. In this configuration, the control circuit is used to switch the first n-channel JFET between a conducting and a nonconducting state. The second n-channel JFET is switched between a conducting and a non-conducting state by means of a p-channel JFET having its source and drain connected between the gate of the second n-channel JFET and the positive output terminal, and its gate terminal connected to the internal node. When the first n-channel JFET is conducting, the voltage developed across the terminals of the inductor will hold the p-channel JFET off which will in turn hold the second n-channel JFET in the off or non-conducting state. When the first n-channel JFET is switched off by the control signal, the inductive kickback voltage across the terminals of the inductor will switch the p-channel JFET into an on state which will in turn switch the second n-channel JFET into an on or conducting state. The switching sequence will then repeat in response to the generated control signal. All three JFETs have a very low terminal voltage source to drain when in the on or conducting state. That is to say, each JFET has a very small internal resistance between source and drain in the on state. The current carriers in the JFETs are all majority carriers which results in very short switching transition times. As a result, this circuit also offers significant improvements over existing circuits in high frequency switching as well as high power applications.

A fifth embodiment of the present invention is similar to the fourth embodiment with the addition of a third n-channel JFET with source and drain connected between the common negative terminal and the gate of the second n-channel JFET. The gate of this third n-channel JFET is connected to the common internal node. When the first n-channel JFET is conducting, the voltage developed across the terminals of the inductor will hold the p-channel JFET off which will in turn hold the second n-channel JFET in the off or non-conducting state. In addition, the third n-channel JFET will be on. This will hold the gate of the second n-channel JFET low which will ensure that it remains in the off state. When the first n-channel JFET is switched off by the control signal, the inductive kickback voltage across the terminals of the inductor will switch the p-channel JFET into an on state and switch the third n-channel JFET into an off state which will in turn switch the second n-channel JFET into an on or conducting state. The switching sequence will then repeat in response to the generated control signal. All JFETs have a very low terminal voltage source to drain when in the on or conducting state. That is to say, each JFET has a very small internal resistance between source and drain in the on state. The current carriers in the JFETs are all majority carriers which results in very short switching transition times. As a result, this circuit also offers significant improvements over existing circuits in high frequency switching as well as high power applications.

For all five configurations, the internal switching control circuitry can be realized with simple current control to vary both frequency and duty cycle. Furthermore, high frequency applications can be accomplished without the need for complex zero voltage switching, zero current switching or synchronous rectifying circuitry.

DETAILED DESCRIPTION OF THE INVENTION

In the following detailed description of the present invention, a buck converter with normally off JFET, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
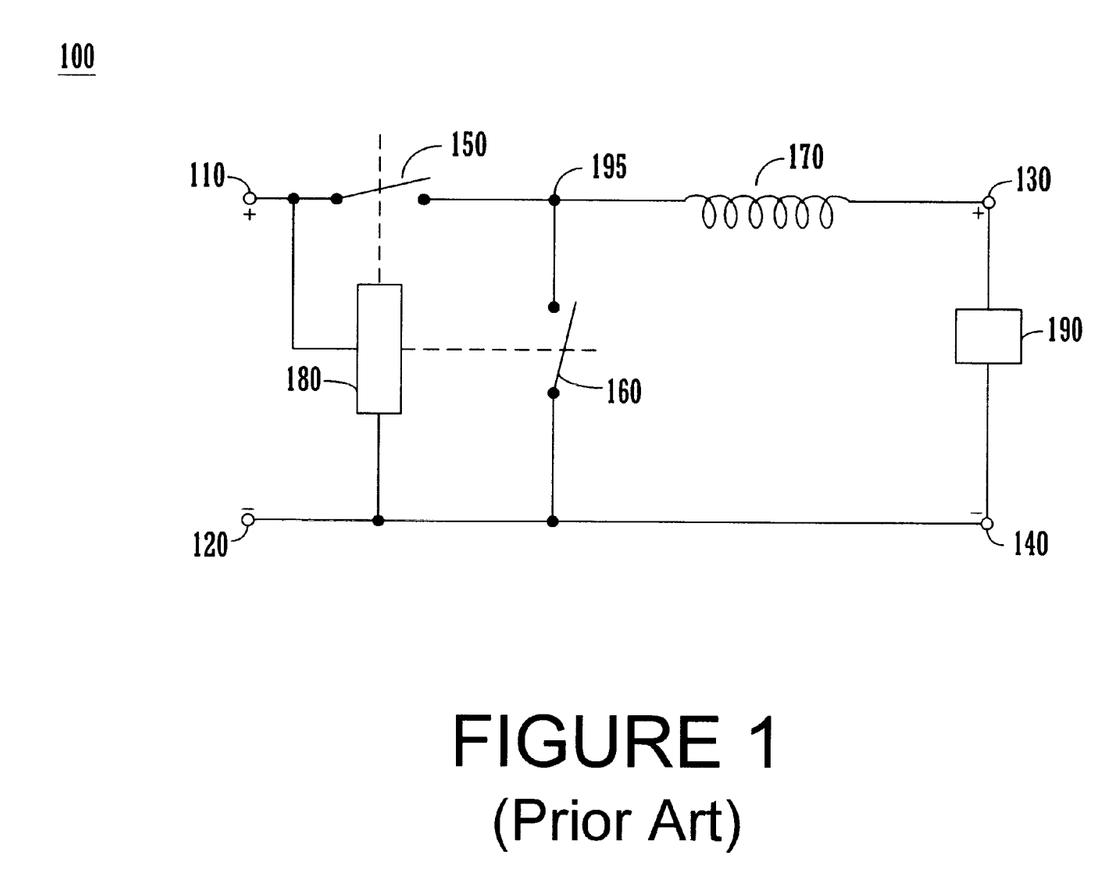
FIG. 1 is a generic diagram of a dc-dc buck converter circuit.

The generic diagram for a dc-dc buck converter circuit 100 is shown in FIG. 1 as a two-port network having a positive input terminal 110, a positive output terminal 130, and a negative input terminal 120 connected to a negative output terminal 140. In order to function properly, an electrical load 190 must be placed across the output terminals. A first switch 150 is connected between the positive input terminal and an internal node 195. A second switch 160 is connected between the internal node and the common negative terminals. Both switches are operated by a control circuit 180 such that one switch is always open. A single inductor 170 is connected between the positive output terminal and the internal node. The circuit has two operating states according to the positions of the two switches. The control circuit continually switches the circuit back and forth between the two states. In the first state, switch 150 is closed while switch 160 is open. In this state, a dc current is established in the inductor which then acts as an energy storage element. In the second state, switch 150 is open while switch 160 is closed. In this state, the inductor acting as a current source tends to maintain the dc current through the load. By these means, a dc voltage applied at the input terminals will result in a dc voltage of equal or less value across the output terminals. The actual value of the dc output voltage can be controlled by the time switch 150 is closed relative to the time it is open. With switch 150 held closed and switch 160 held open, the dc output voltage will equal the dc input voltage. Under switching action, with switch 150 alternately closed and open, the dc output voltage will be less than the dc input voltage. Holding switch 150 open while switch 160 is closed will result in a zero output voltage.

Figure 2:
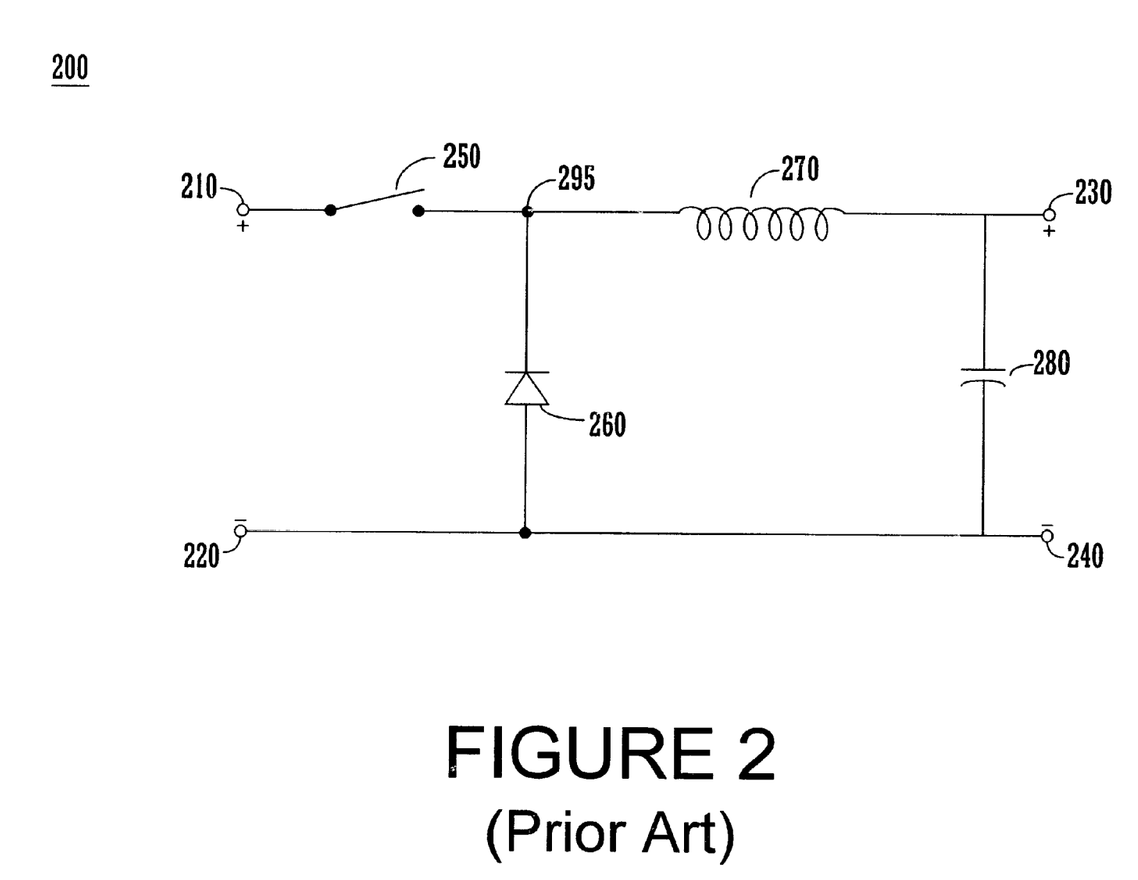
FIG. 2 is the generalized topology for a dc-dc buck converter circuit using a single switch and a rectifier diode.

FIG. 2 is the generalized topology for a dc-dc buck converter circuit 200 using a single switch 250 and a rectifier diode 260. The circuit is shown as a two-port network having a positive input terminal 210, a positive output terminal 230 and a negative input terminal 220 connected to a negative output terminal 240. The switch is connected between the positive input terminal and an internal node 295. The cathode of the diode is connected to the internal node and the anode is connected to the common negative terminals. An inductor 270 is connected between the positive output terminal and the cathode of the diode. A capacitor 280 acts as an electrical load placed across the output terminals. This circuit has two operating states according to whether the switch is open or closed. In the first state, the switch is closed and a dc current is established in the inductor which then acts as an energy storage element When the switch is closed, the diode is reverse biased and thus acts as an open switch blocking any current through it. In the second state, the switch is open and the inductor acting as a current source tends to maintain the dc current through the load. In this state, the diode is forward biased and thus acts as a closed sub to conduct current. By these means, a dc voltage applied at the input terminals will result in a dc voltage of equal or less value across the output terminals. The actual value of the dc output voltage can be controlled by the time the switch is closed relative to the time it is open. With the switch held closed, the dc output voltage will be equal to the dc input voltage. Under switching action, with the switch alternately closed and open, the dc output voltage will be less than the dc input voltage. Holding the switch open will result in a zero output voltage.

Figure 3:
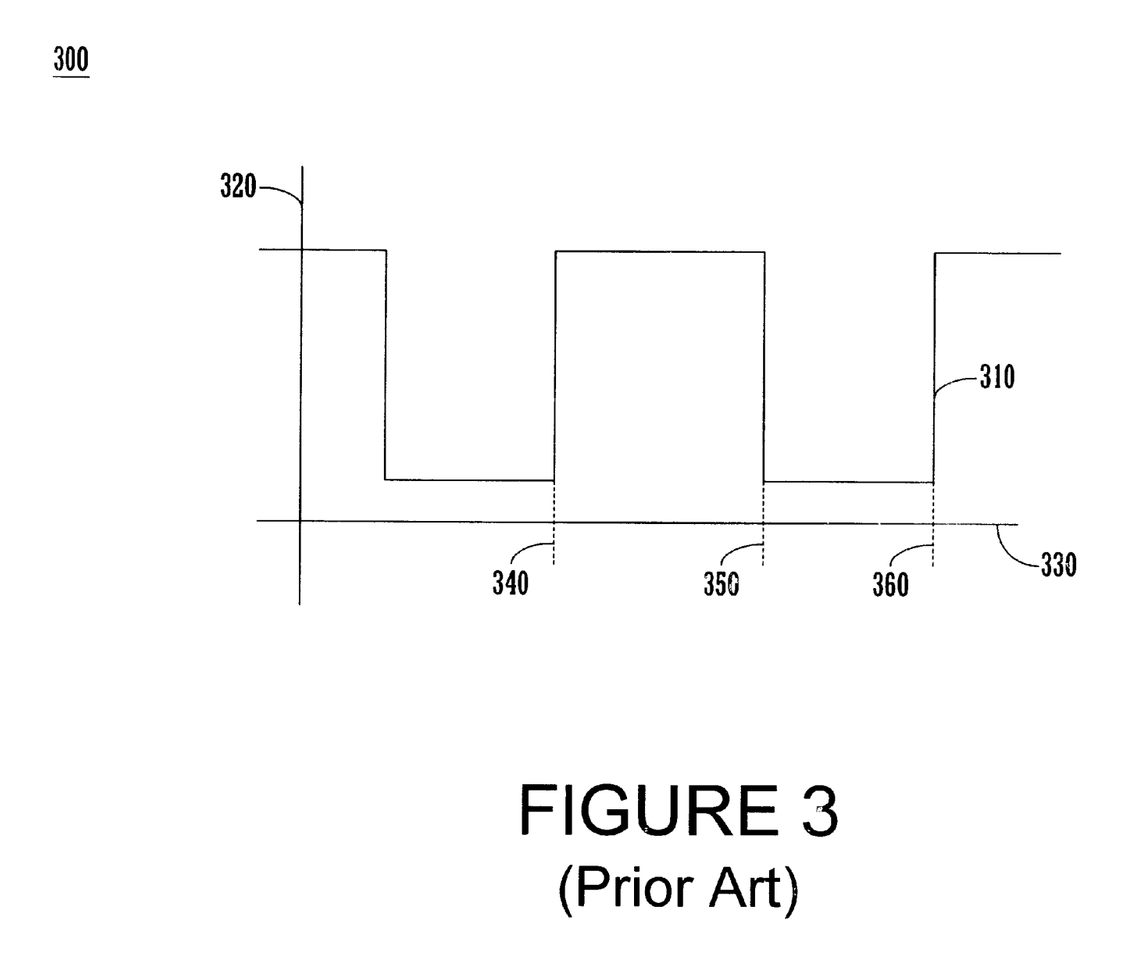
FIG. 3 is an exemplary pulse width modulated control waveform for holding switches in a current conducting state or in a current blocking state.

FIG. 3 is an exemplary pulse width modulated control waveform 300 for holding a switch in a current conducting state or in a current blocking state. The vertical scale 320 may be either a current or a voltage, and the horizontal scale 330 is in units of time. The waveform 310 is periodic with time period measured from point 340 to point 360. The high waveform level is measured from point 340 to point 350, while the low waveform level is measured from point 350 to point 360. The waveform can be considered a series of positive pulses, each positive pulse being measured from point 340 to point 350. Alternately, the waveform can be considered a series of negative pulses, each negative pulse being measured from point 350 to point 360. Either the positive pulse or the negative pulse can be used to change the state of a switch between a current conducting state or a current blocking state according to the characteristics of the switch. The dc component of the waveform is proportional to pulse width which in turn is proportional to the dc output voltage level. That is, the ratio of positive pulse time to time period or the ratio of negative pulse time to time period is proportional to the dc output voltage level. Thus, modulating the pulse width is a means for controlling the dc output voltage level. Reducing the width of the negative pulses to zero will produce a waveform held at the high level which will result in an output voltage that is either zero or equal to the dc input voltage. Reducing the width of the positive pulses to zero will produce a waveform held at the low level which will result in an output voltage that is either zero or equal to the dc input voltage.

Figure 4:
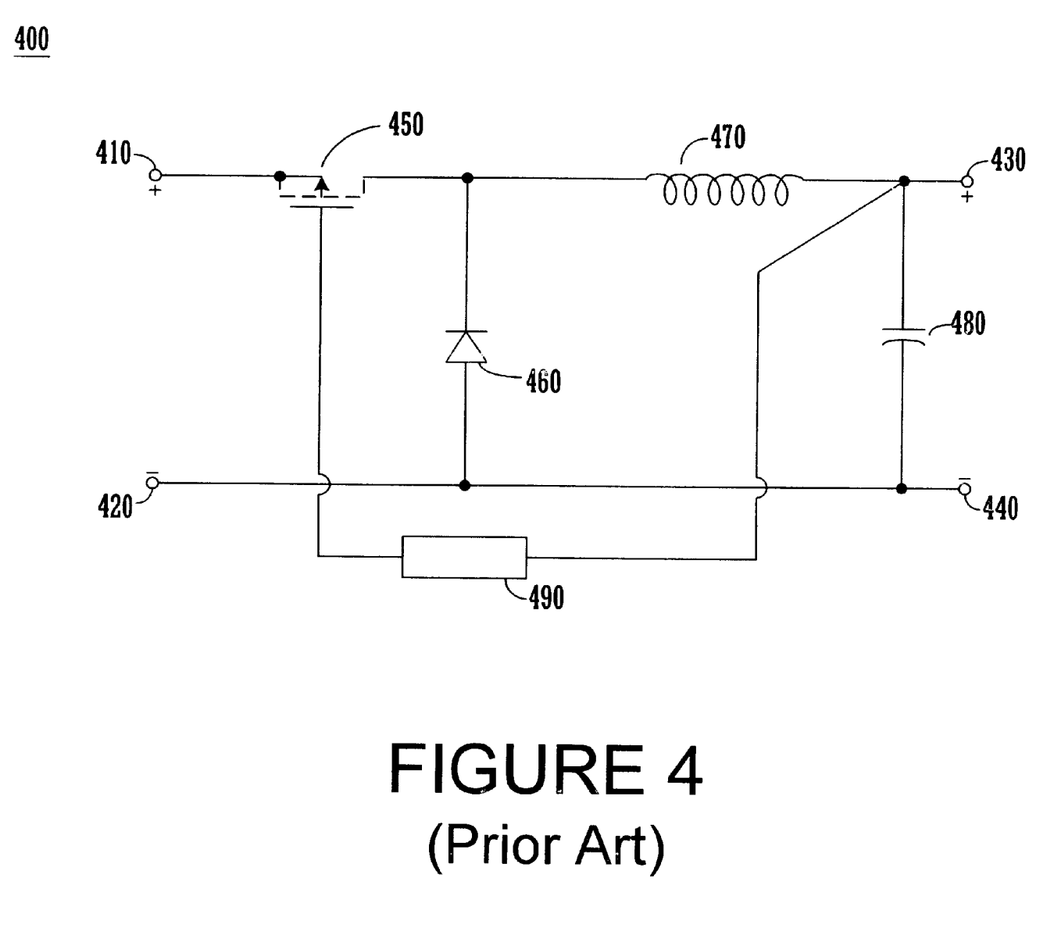
FIG. 4 is a circuit diagram for a prior art dc-dc buck converter using a single MOSFET.

FIG. 4 is a circuit diagram 400 for a prior art dc-dc buck converter using a single MOSFET 450 as a switch and a rectifier diode 460. The circuit is shown as a two-part network having a positive input terminal 410, a negative input terminal 420, a positive output terminal 430 and a negative output terminal 440. An inductor 470 is connected between the positive output terminal and the cathode of the diode. A capacitor 480 acts as an electrical load placed across the output terminals. A control circuit 490 is coupled to the gate lead of the MOSFET for switching between current conducting and current blocking states. The control circuit is operated as a pulse width modulator and thus controls the level of the dc output voltage.

Figure 5:
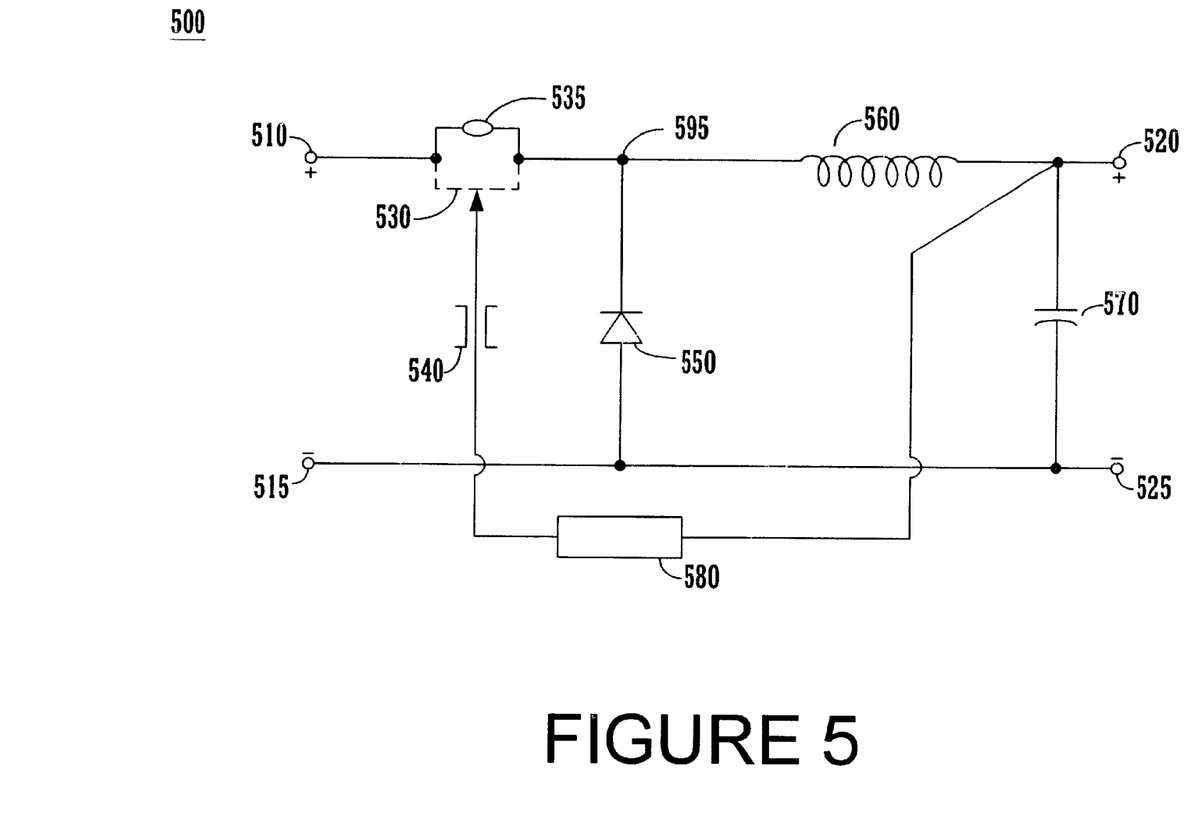
FIG. 5 is a circuit diagram for a dc-dc buck converter using a single n-channel enhancement mode JFET according to the present invention.

FIG. 5 is a circuit diagram 500 for a dc-dc buck converter using a single n-channel enhancement mode JFET 530, as described in copending U.S. patent application Ser. No.

091708,336, "STARTER DEVICE FOR NORMALLY "OFF" JFETS", Ho-Yuan Yu, filed Nov. 7, 2000, as a switch and a rectifier diode 550 according to the present invention. In this first embodiment, the circuit is shown as a two-part network having a positive input terminal 510, a positive output terminal 520, and a negative input terminal 615 connected to a negative output terminal 525. An inductor 560 is connected between the positive output terminal and an internal node 595. The cathode of the diode is connected to the internal node and the diode anode is connected to the common negative terminals. A capacitor 570 acts as an electrical load placed across the output terminals. The JFET source and drain are connected between the positive input terminal and the internal node.

A starter device 535 is connected between source and drain of the JFET. This starter device can be built in to the enhancement mode JFET either by the add on module or by parasitic structure. A control circuit 580 is coupled to the gate lead of the JFET for switching between current conducting and current blocking states. A current limiting device 540 can be connected in series between the control circuit and the gate lead of the JFET for gate protection. With the JFET in a current conducting state, a voltage source connected across the input terminals causes a dc current in a path entering the positive input terminal, passing through the JFET and the inductor, into the capacitor and out the positive output terminal through a loads into the negative output terminal and out the negative input terminal returning to the voltage source. With the JFET in the current blocking state, the energy stored in the inductor causes a dc current in a path through the inductor entering the capacitor and out the positive output terminal through a load, into the negative output terminal and through the rectifier diode back to the inductor. The control circuit is operated as a pulse width modulator and thus controls the level of the dc output voltage.

The control waveform applied to the gate lead of the JFET can be considered a series of positive pulses in which a positive pulse switches the JFET into a current conducting state. The dc output voltage is then proportional to the ratio of the positive pulse time to the waveform period time. Holding the waveform in the low state holds the JFET in a current blocking state which results in a zero dc output voltage. Holding the waveform in the high state holds the JFET in a current conducting state which results in a dc output voltage equal to the dc input source voltage. It is to be appreciated that a similar dc-dc buck converter circuit is realizable using a p-channel enhancement mode JFET and appropriate changes in the control waveform.

Figure 6:
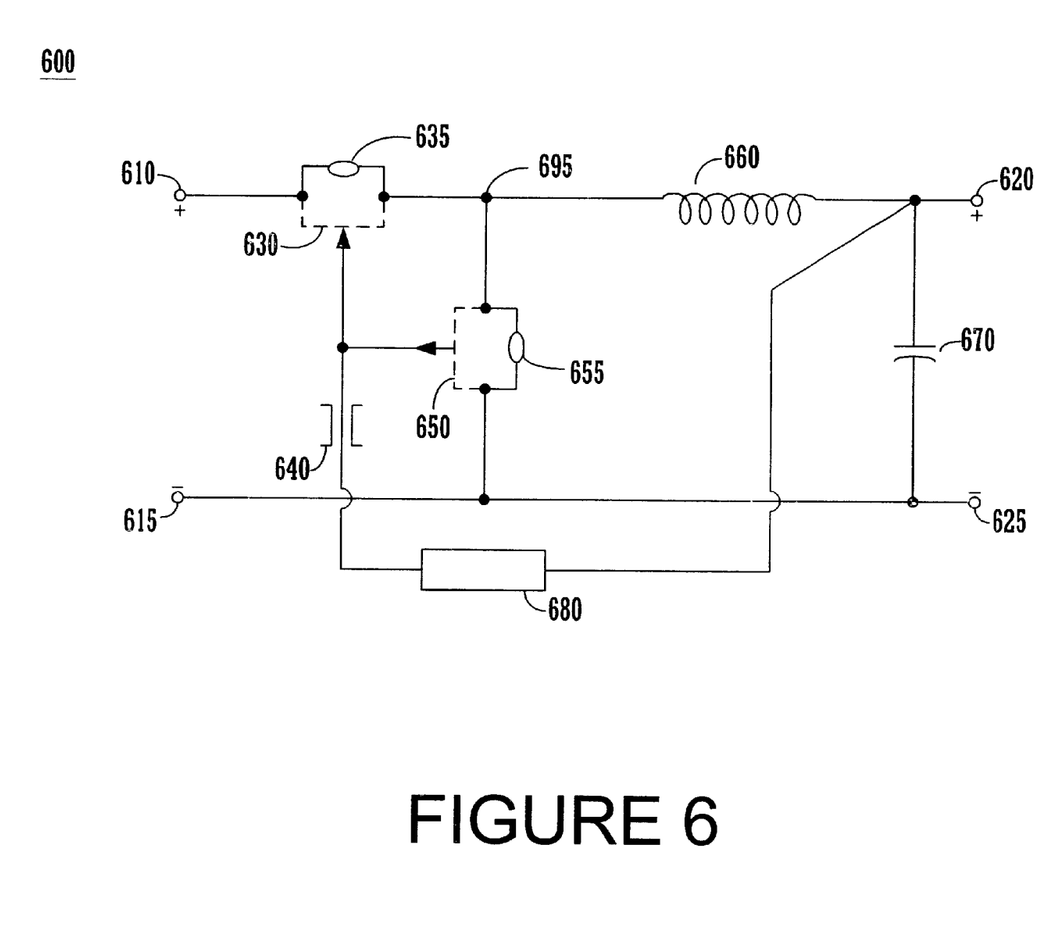
FIG. 6 is a circuit diagram for a dc-dc buck converter using a single n-channel enhancement mode JFET and a single p-channel enhancement mode JFET according to the present invention.

FIG. 6 is a circuit diagram 600 for a dc-dc buck converter using an n-channel enhancement mode JFET 630 as a first switch and a p-channel enhancement mode JFET 650 as a second switch according to the present invention. In this second embodiment, the circuit is shown as a two-port network having a positive input terminal 610, a positive output terminal 620, and a negative input terminal 615 connected to a negative output terminal 625. An inductor 660 is connected between the positive output terminal and an internal node 695. A capacitor 670 acts as an electrical load placed across the output terminals. The n-channel JFET source and drain are connected between the positive input terminal and the internal node. The p-channel JFET source and drain are connected between the common negative terminals and the internal node.

Starter devices 635 and 655 can be connected between source and drain of the n-channel JFET and the p-channel JFET respectively. A control circuit 680 is coupled to the gate leads of both JFETs for switching them between current conducting and current blocking states. A current limiting device 640 can be connected in series between the control circuit and the gate leads of the JFETs for gate protection. When the n-channel JFET is in a current conducting state, the p-channel JFET will be held in a current blocking state. Under this is condition, a voltage source connected across the input terminals causes a dc current in a path entering the positive input terminal, passing through the n-channel JFET and the inductor, into the capacitor and out the positive output terminal through a load, into the negative output terminal and out the negative input terminal returning to the voltage source.

When the n-channel JFET is in the current blocking state, the p-channel JFET will be held in a current conducting state. Under this condition, the energy stored in the inductor causes a dc current in a path through the inductor entering the capacitor and out the positive output terminal through a load, into the negative output terminal and through the p-channel JFET back to the inductor. The control circuit is operated as a pulse width modulator and thus controls the level of the dc output voltage. The control waveform applied to the gate leads of the JFETs can be considered a series of positive pulses in which a positive pulse switches the n-channel JFET into the current conducting state, and simultaneously switches the p-channel JFET into the current blocking state. The dc output voltage is then proportional to the ratio of the positive pulse time to the waveform period time. Holding the waveform in the low state holds the n-channel JFET in a current blocking state which results in a zero dc output voltage. Holding the waveform in the high state holds the n-channel JFET in a current conducting state which results in a dc output voltage equal to the dc input source voltage. It is to be appreciated that a similar dc-dc buck converter circuit is realizable by interchanging the positions of the n-channel and p-channel JFETs with appropriate changes in the control waveform.

Figure 7:
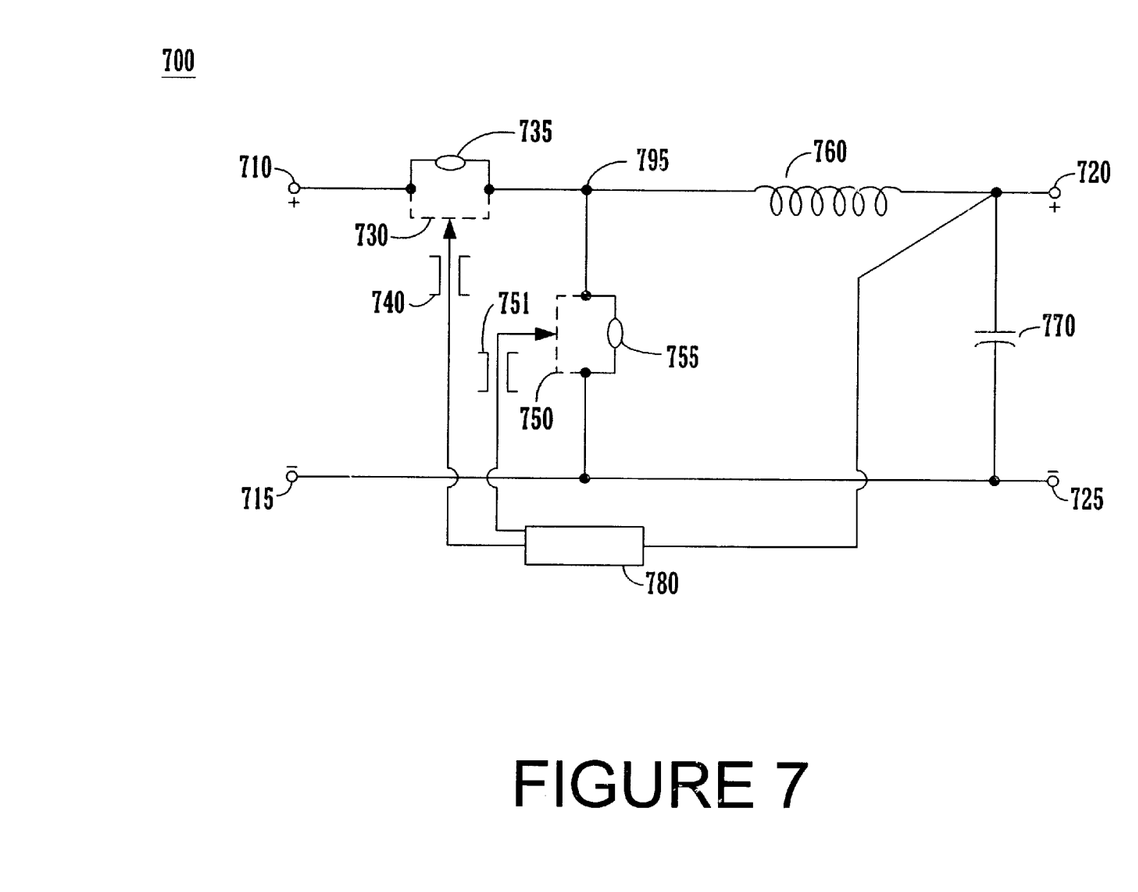
FIG. 7 is a circuit diagram for a dc-dc buck converter using two n-channel enhancement mode JFETs and a control circuit that generates two, one hundred eighty degree out of phase control signals according to the present invention.

FIG. 7 is a circuit diagram 700 for a dc-dc buck converter using an n-channel enhancement mode JFET 730 as a first switch and an n-channel enhancement mode JFET 750 as a second switch according to the present invention. In this third embodiment, the circuit is shown as a two-port network having a positive input terminal 710, a positive output terminal 720, and a negative input terminal 715 connected to a negative output terminal 725. An inductor 760 is connected between the positive output terminal and an internal node 795. A capacitor 770 acts as an electrical load placed across the output terminals. The first n-channel JFET source and drain are connected between the positive input terminal and the internal node. The second n-channel JFET source and drain are connected between the common negative terminals and the internal node.

Starter devices 735 and 755 can be connected between source and drain of the first n-channel JFET and the second n-channel JFET respectively. A control circuit 780 is coupled to the gate leads of both JFETs for switching them between current conducting and current blocking states. The control circuit generates two switching signals that are one hundred eighty degrees out of phase; that is to say, the two signals are mirror images. One control signal is applied to the gate of the first n-channel JFET 730 and the second control signal is applied to the gate of the second n-channel JFET 750 in order to switch the JFETs on and off. The phase difference between the two control signals ensure is that one JFET is always in a non-conducting state while the other JFET is in a conducting state. Current limiting devices 740 and 751 can be connected in series between the control circuit and the gate leads of the JFETs for gate protection. When one n-channel JFET is in a current conducting state, the other n-channel JFET will be held in a current blocking state. Under this condition, a voltage source connected across the input terminals causes a dc current in a path entering the positive input terminal, passing through the first n-channel JFET 730 and the inductor, into the capacitor and out the positive output terminal through a load, into the negative output terminal and out the negative input terminal returning to the voltage source.

When the first n-channel JFET 730 is in the current blocking state, the second n-channel JFET 750 will be held in a current conducting state. Under this condition, the energy stored in the inductor causes a dc current in a path through the inductor entering the capacitor and out the positive output terminal through a load, into the negative output terminal and through the second n-channel JFET 750 back to the inductor. The control circuit is operated as a pulse width modulator and thus controls the level of the dc output voltage. The control waveforms applied to the gate leads of the JFETs can be considered a series of positive pulses in which a positive pulse switches an n-channel JFET into the current conducting state. The dc output voltage is then proportional to the ratio of the positive pulse time to the waveform period time. Holding the waveform in the low state holds an n-channel JFET in a current blocking state, while holding the waveform in the high state holds an n-channel JFET in a current conducting state. It is to be appreciated that a similar dc-dc buck converter circuit is realizable by replacing the n-channel JFETs with p-channel JFETs.

Figure 8:
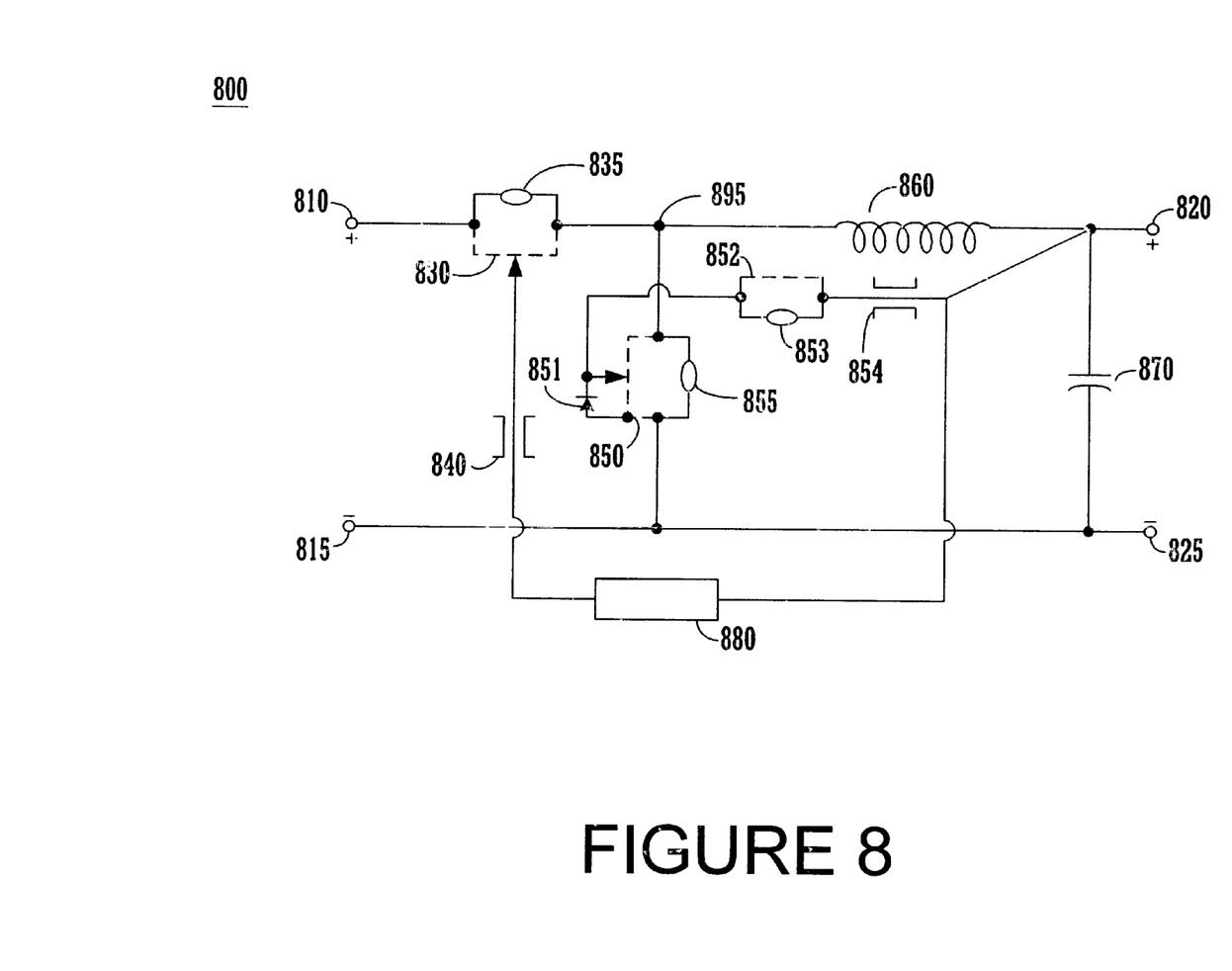
FIG. 8 is a self biased synchronized rectifier using a small p-channel enhancement mode JFET to turn on the large n-channel enhancement mode JFET when the switching device is turned off according to the present invention.

FIG. 8 is a circuit diagram 800 for a dc-dc buck converter using an n-channel enhancement mode JFET 830 as a first switch and an n-channel enhancement mode JFET 850 as a second switch according to the present invention. In this fourth embodiment, the circuit is shown as a two-port network having a positive input terminal 810, a positive output terminal 820, and a negative input terminal 815 connected to a negative output terminal 825. An inductor 860 is connected between the positive output terminal and an internal node 895. A capacitor 870 acts as an electrical load placed across the output terminals. The first n-channel JFET 830 source and drain are connected between the positive input terminal and the internal node. The second n-channel JFET 850 source and drain are connected between the common negative terminals and the internal node.

Starter devices 835 and 855 can be connected between source and drain of the first n-channel JFET and the second n-channel JFET respectively. A control circuit 880 is coupled to the gate lead of the first n-channel JFET 830 for switching between current conducting and current blocking states. A current limiting device 840 can be connected in series with the gate lead of the n-channel JFET 830 for gate protection. The second n-channel JFET 850 is switched between a conducting and a non-conducting state by means of a p-channel JFET 852 having its source and drain connected between the gate of the second n-channel JFET and the positive output terminal, and its gate terminal connected to the internal node 895. When the first n-channel JFET 830 is conducting, the voltage developed across the terminals of the inductor will hold the p-channel JFET 852 off rich will in turn hold the second n-channel JFET 850 in the off or non-conducting state. When the first n-channel JFET 830 is switched off by the control signal, the inductive kickback voltage across the terminals of the inductor will switch the p-channel JFET 852 into an on state which will in turn switch the second n-channel JFET 850 into an on or conducting state. The switching sequence will then repeat in response to the generated control signal. A starter device 853 may be placed between the source and drain terminals of the p-channel JFET, and a current limiting device s 854 may be coupled in series with the p-channel JFET for gate protection of the second n-channel JFET 850. A diode 851 to aid in switching the second n-channel JFET 850 is coupled between its gate and source. With the first n-channel JFET 830 in a conducting state, a voltage source connected across the input terminals causes a dc current in a path entering the positive input terminal, passing through the first n-channel JFET 830 and the inductor, into the capacitor and out the positive output terminal through a load, into the negative output terminal and out the negative input terminal returning to the voltage source.

When the first n-channel JFET 830 is in the current blocking state, the is second n-channel JFET 850 will be held in a current conducting state. Under this condition, the energy stored in the inductor causes a dc current in a path through the inductor entering the capacitor and out the positive output terminal through a load, into the negative output terminal and through the second n-channel JFET 850 back to the inductor. The control circuit is operated as a pulse width modulator and thus controls the level of the dc output voltage. The control waveform applied to the gate lead of the first n-channel JFET 830 can be considered a series of positive pulses in which a positive pulse switches an n-channel JFET into the current conducting state. The dc output voltage is then proportional to the ratio of the positive pulse time to the waveform period time. Holding the waveform in the low state holds an n-channel JFET in a current blocking state, while holding the waveform in the high state holds an n-channel JFET in a current conducting state. It is to be appreciated that a similar dc-dc buck converter circuit is realizable by replacing the n-channel JFETs with p-channel JFETs.

Figure 9:
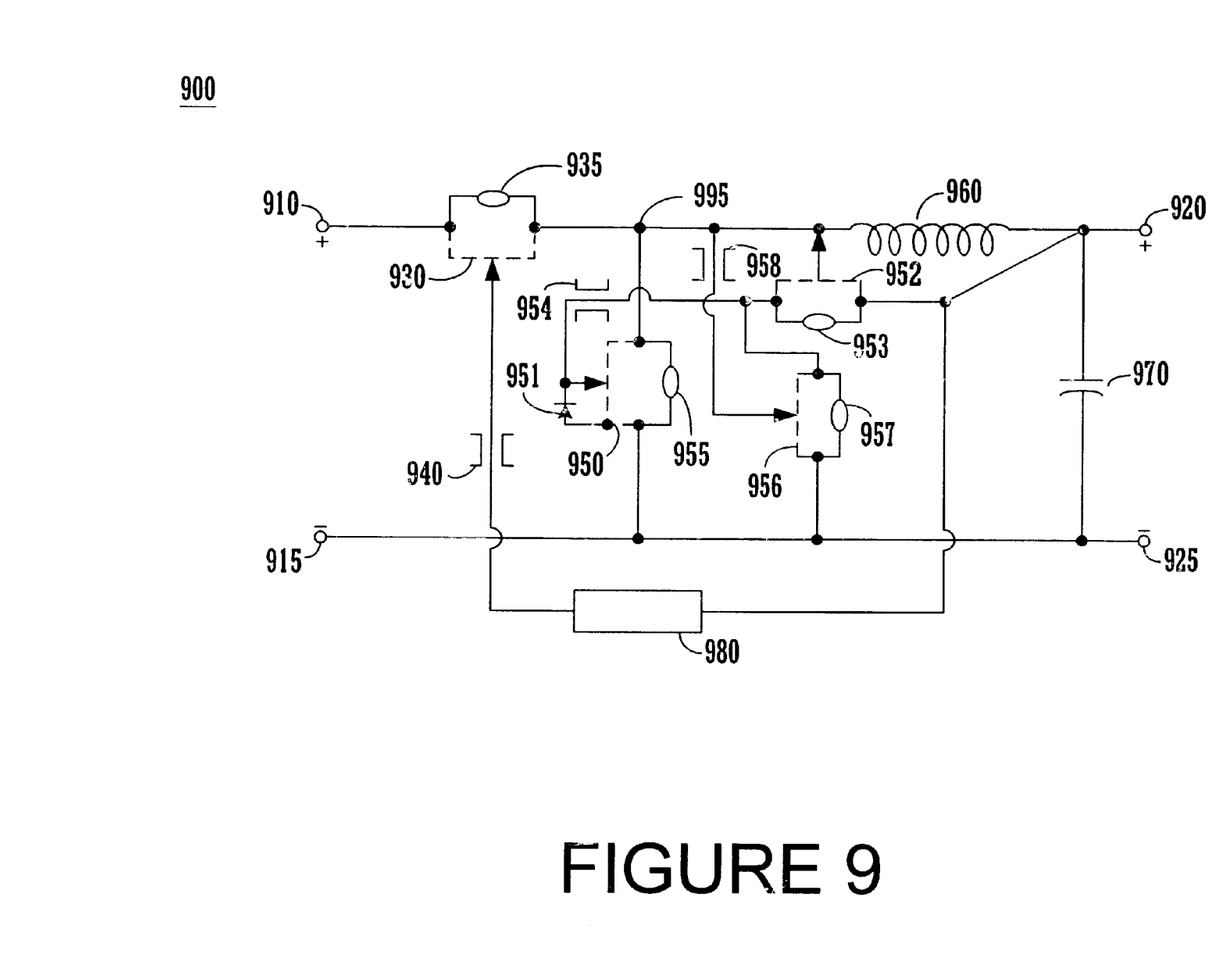
FIG. 9 is a version of the circuit in FIG. 8 with an additional small n-channel enhancement mode JFET used to ensure the main n-channel enhancement mode JFET is turned off.

FIG. 9 is a circuit diagram 900 for a dc-dc buck converter using an n-channel enhancement mode JFET 930 as a first switch and an n-channel enhancement mode JFET 950 as a second switch according to the present invention. In this fifth embodiment, the circuit is shown as a two-port network having a positive input terminal 910, a positive output terminal 920, and a negative input terminal 915 connected to a negative output terminal 925. An inductor 960 is connected between the positive output terminal and an internal node 995. A capacitor 970 acts as an electrical load placed across the output terminals. The first n-channel JFET 930 source and drain are connected between the positive input terminal and the internal node. The second n-channel JFET 950 source and drain are connected between the common negative terminals and the internal node.

Starter devices 935 and 955 can be connected between source and drain of the first n-channel JFET and the second n-channel JFET respectively. A control circuit 980 is coupled to the gate lead of the first n-channel JFET 930 for switching between current conducting and current blocking states. A current limiting device 940 can be connected in series with the gate lead of the n-channel JFET 930 for gate protection.

The second n-channel JFET 950 is switched between a conducting and a non-conducting state by means of a p-channel JFET 952 having its source and drain connected between the gate of the second n-channel JFET 950 and the positive output terminal, and its gate terminal connected to the internal node 995. When the first n-channel JFET 930 is conducting, the voltage developed across the terminals of the inductor will hold the p-channel JFET 952 off which will in turn hold the second n-channel JFET 950 in the off or non-conducting state. A third n-channel enhancement mode JFET 956 is coupled with source and drain between the common negative terminal and the gate of the second n-channel JFET 950 in order to ensure switching of the second n-channel JFET 950. The gate of the third n-channel JFET 956 is coupled to the internal node and a current limiting device 958 may be used in series with this connection for gate protection. A starter device 957 is coupled between source and drain of the this third n-channel JFET 956. When the first n-channel JFET 930 is conducting, the third n-channel JFET 956 will be conducting which will ensure the second n-channel JFET 950 is nonconducting by holding its gate lead low. When the first n-channel JFET 930 is non-conducting, the third n-channel JFET 956 will also be non-conducting which will allow the gate of the second n-channel JFET 950 to go high and thereby switch it into a conducting state.

When the first n-channel JFET 930 is switched off by the control signal, the inductive kickback voltage across the terminals of the inductor will switch the p-channel JFET 952 into an on state which will in turn switch the second n-channel JFET 950 into an on or conducting state. The switching sequence will then repeat in response to the generated control signal. A starter device 953 may be placed between the source and drain terminals of the p-channel JFET, and a current limiting device 954 may be coupled in series with the p-channel JFET for gate protection of the second n-channel JFET 950. A diode 951 to aid in switching the second n-channel JFET 950 is coupled between its gate and source.

With the first n-channel JFET 930 in a conducting state, a voltage source connected across the input terminals causes a dc current in a path entering the positive input terminal, passing through the first n-channel JFET 930 and the inductor, into the capacitor and out the positive output terminal through a load, into the negative output terminal and out the negative input terminal returning to the voltage source.

When the first n-channel JFET 930 is in the current blocking state, the second n-channel JFET 950 will be held in a current conducting state. Under this condition, the energy stored in the inductor causes a dc current in a path through the inductor entering the capacitor and out the positive output terminal through a load, into the negative output terminal and through the second n-channel JFET 950 back to the inductor. The control circuit is operated as a pulse width modulator and thus controls the level of the dc output voltage. The control waveform applied to the gate lead of the first n-channel JFET 930 can be considered a series of positive pulses in which a positive pulse switches an n-channel JFET into the current conducting state. The dc output voltage is then proportional to the ratio of the positive pulse time to the waveform period time. Holding the waveform in the low state holds an n-channel JFET in a current blocking state, while holding the waveform in the high state holds an n-channel JFET in a current conducting state. It is to be appreciated that a similar dc-dc buck converter circuit is realizable by replacing the n-channel JFETs with p-channel JFETs.

For all five configurations, the internal switching control circuitry can be realized with simple current control to vary both frequency and duty cycle. Furthermore, high frequency applications can be accomplished without the need for complex zero voltage switching, zero current switching or synchronous rectifying circuitry.

The preferred embodiment of the present invention, a buck converter with normally off JFET, is thus described.

While the present invention has been described in particular embodiments, it should be appreciated that the present invention should not be construed as limited by such embodiments, but rather construed according to the below claims.

What is claimed is:

1. A buck converter circuit comprising:
   a) at least one enhancement mode JFET coupled to the input;
   b) an inductor coupled to the output;
   c) a current rectifying device, and
   d) a control circuit.

2. A buck converter circuit according to claim 1 wherein said control circuit is for switching said JFET between a current blocking state and a current conducting state.

3. A buck converter circuit according to claim 1 wherein said control circuit is for determining the frequency at which said JFET is switched between a current blocking state and a current conducting state.

4. A buck converter circuit according to claim 1 wherein the ratio of dc output voltage to dc input voltage is determined by the ratio of said JFET current conducting time to the sum of said JFET current conducting time and said JFET current blocking time.

5. A buck converter circuit comprising:
   a) a two-port network comprising a positive input terminal; a positive output terminal, and a negative terminal common to the input and the output;
   b) an enhancement mode Junction Field Effect Transistor (JFET) coupled with source and drain between said positive input terminal and an inductor;
   c) said inductor coupled between said JFET and said positive output terminal;
   d) a rectifier diode coupled between said inductor and said JFET and said negative output terminal, and
   e) a control circuit for switching said JFET.

6. A buck converter circuit according to claim 5 wherein said negative input terminal is connected to said negative output terminal to form a common ground.

7. A buck converter circuit according to claim 5 wherein the gate of said JFET is coupled to said control circuit.

8. A buck converter circuit according to claim 5 wherein said control circuit is for switching said JFET between a current blocking state and a current conducting state.

9. A buck converter circuit according to claim 5 wherein said control circuit is for determining the frequency at which said JFET is switched between a current blocking state and a current conducting state.

10. A buck converter circuit according to claim 5 further comprising a capacitor connected between said positive output terminal and said negative output terminal.

11. A buck converter circuit according to claim 5 further comprising a starter device connected between said source lead and said drain lead of said JFET.

12. A buck converter circuit according to claim 5 further comprising a current limiting device connected in series between said gate lead of said JFET and said control circuit.

13. A buck converter circuit comprising:
   a) a two-port network comprising a positive input terminal; a positive output terminal, and a negative terminal common to the input and the output;
   b) an enhancement mode n-channel Junction Field Effect Transistor (JFET) coupled with source and drain between said positive input terminal and an inductor;
   c) said inductor coupled between said n-channel JFET and said positive output terminal;

d) an enhancement mode p-channel JFET coupled with source and drain between said inductor and said n-channel JFET and said negative output terminal, and e) a control circuit for switching said JFETs.

14. A buck converter circuit according to claim 13 wherein said negative input terminal is connected to said negative output terminal to form a common ground.

15. A buck converter circuit according to claim 13 wherein said control circuit is for holding said n-channel JFET in a current blocking state while said p-channel JFET is held in a current conducting state.

16. A buck converter circuit according to claim 13 wherein said control circuit is for holding said p-channel JFET in a current blocking state while said n-channel JFET is held in a current conducting state.

17. A buck converter circuit according to claim 13 wherein said control circuit is for determining the frequency at which said n-channel JFET and said p-channel JFET are switched between a current blocking state and a current conducting state.

18. A buck converter circuit according to claim 13 further comprising capacitor connected between said positive output terminal and said negative output terminal.

19. A buck converter circuit according to claim 13 wherein said n-channel JFET is replaced with a p-channel JFET and said p-channel JFET is replaced with an n-channel JFET.

20. A buck converter circuit comprising:

a) a two-port network comprising a positive input terminal; a positive output terminal, and a negative terminal common to the input and the output;

b) a first enhancement mode n-channel Junction Field Effect Transistor (JFET) coupled with source and drain between said positive input terminal and an inductor;

c) said inductor coupled between said n-channel JFET and said positive output terminal;

d) a second enhancement mode n-channel JFET coupled with source and drain between said inductor and said n-channel JFET and said negative output terminal, and e) a control circuit for switching said JFETs.

21. A buck converter circuit according to claim 20 wherein said control circuit generates a first switching signal coupled to said first JFET, and a second switching signal coupled to said second JFET such that each said JFET switches alternately between a conducting state and a non-conducting state, said states of said first JFET being non-concurrent with said states of said second JFET.

22. A buck converter circuit according to claim 20 wherein said control circuit generates a signal coupled to said first JFET such that said first JFET switches alternately between a conducting state and a non-conducting state, and a third JFET coupled to the base of said second JFET that switches said second JFET alternately between a conducting state and a non-conducting state by sensing changes in potential difference across the terminals of said inductor, said states of said first JFET being non-concurrent with said states of said second JFET.

23. A buck converter circuit according to claim 22 wherein a third enhancement mode JFET is coupled between the gate of said second JFET and said common negative terminal that will ensure switching of said second JFET between a conducting and a nonconducting state by sensing changes in potential difference between said inductor and said common ground.

* * * * *